May 13, 1958 H. M. SCHWAB 2,834,276
POWER DRIVEN SOIL SPADES
Filed July 20, 1955 2 Sheets-Sheet 1
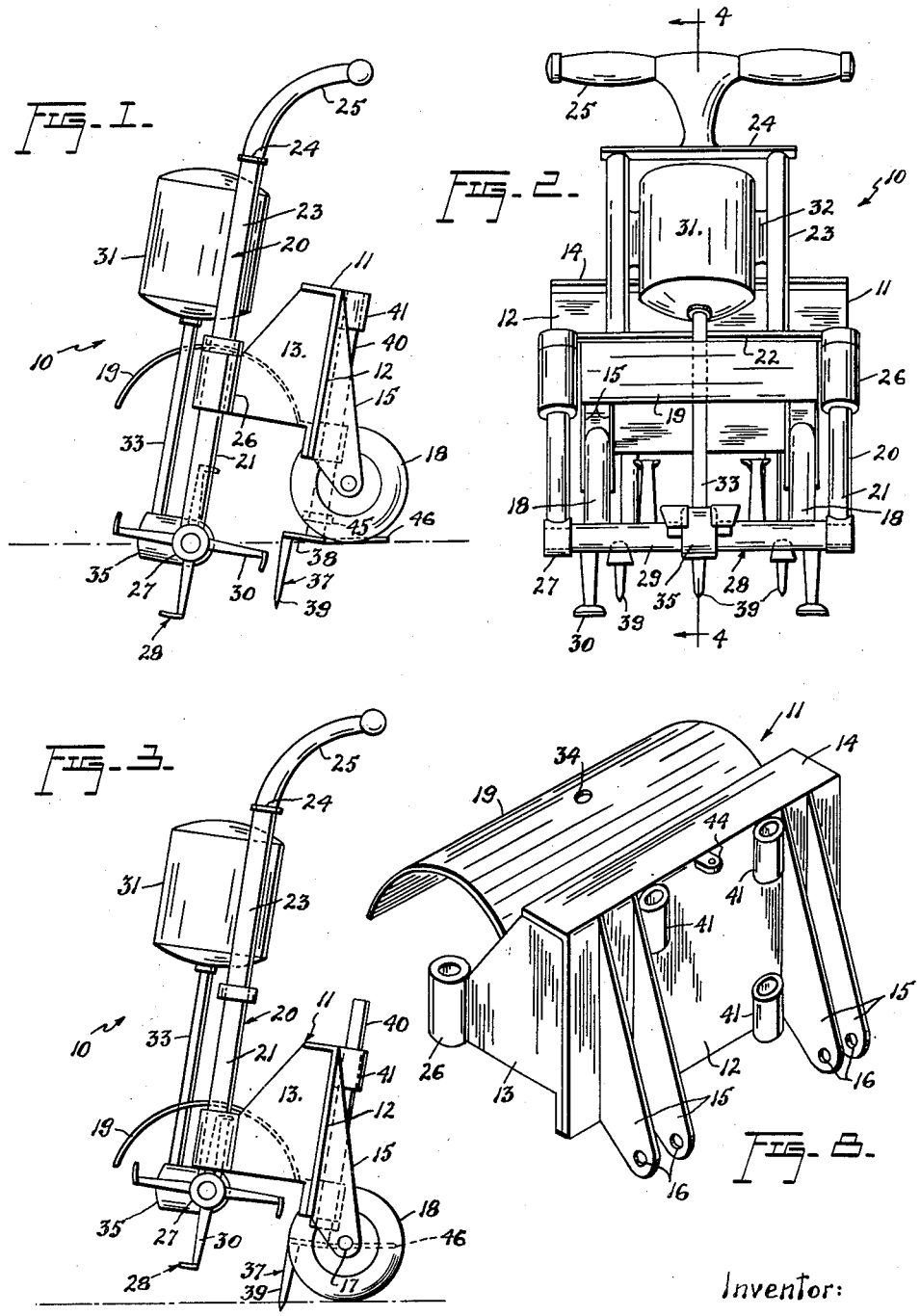
Inventor:
Harold M. Schwab

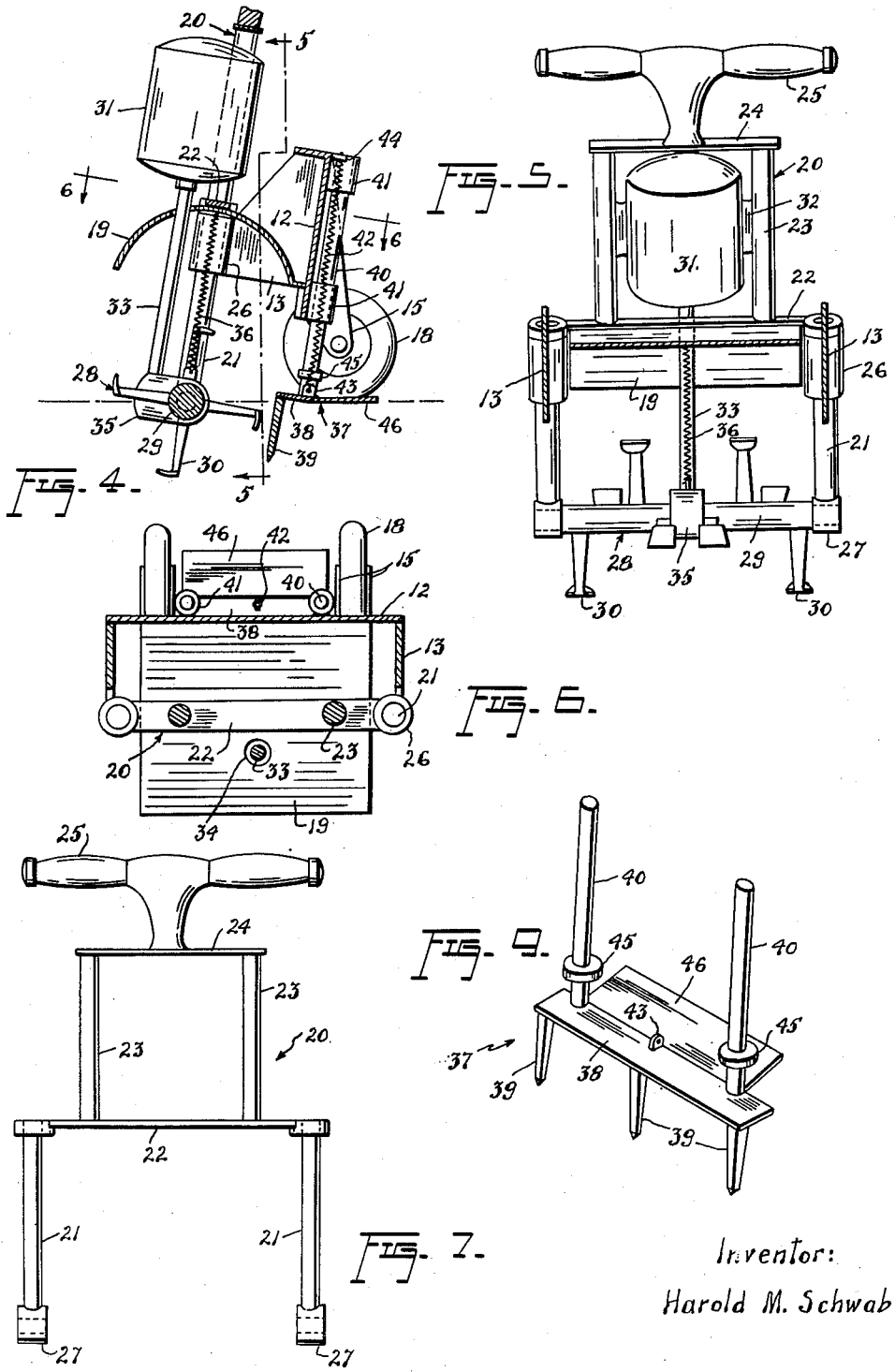

United States Patent Office 2,834,276
Patented May 13, 1958

2,834,276

POWER DRIVEN SOIL SPADES

Harold M. Schwab, Beaverton, Oreg.

Application July 20, 1955, Serial No. 523,181

4 Claims. (Cl. 97—40)

This invention relates to new and useful improvements and structural refinements in soil spades, and the principal object of the invention is to provide a mechanical, power driven spade which may be conveniently and effectively employed for turning over the soil in a garden, or the like.

In particular, this invention concerns itself with an easily portable, self-contained mechanical spade which, unlike much more complex and expensive agricultural tilling implements, may be readily available at nominal cost to small gardeners as well as for home use, and which will effectively perform the soil turning operation without the expenditure of substantial time, labor and effort required in the use of a common hand spade.

Briefly, the invention contemplates the provision of a mechanical spade comprising a wheeled frame, a power driven rotary spade unit mounted on the frame, and means for anchoring the frame to the ground so as to prevent its displacement while the spade unit is in operation.

Some of the advantages of the invention reside in its simple construction and operation, in its durability, and in its adaptability to economical manufacture.

With the above more important objects and features in view and such other objects and features as may become apparent as this specification proceeds, the invention resides in the arrangement of parts and details of construction substantially as shown in the accompanying drawings, wherein like characters of reference are employed to designate like parts and wherein:

Figure 1 is a side elevational view of the invention in its soil working position;

Figure 2 is a front elevational view thereof;

Figure 3 is a side elevational view of the same in position for travelling;

Figure 4 is a vertical sectional view, taken substantially in the plane of the line 4—4 in Figure 2;

Figure 5 is a vertical sectional view, taken substantially in the plane of the line 5—5 in Figure 4;

Figure 6 is a sectional view, taken substantially in the plane of the line 6—6 in Figure 4;

Figure 7 is an elevational view of the carrier used in the invention;

Figure 8 is a rear perspective view of the frame; and

Figure 9 is a front perspective view of the ground anchoring means.

Referring now to the accompanying drawings in detail, the power driven soil spade is designated generally by the reference numeral 10 and embodies in its construction a frame 11 comprising a back plate 12, a pair of side plates 13, a relatively narrow top plate 14 and pairs of substantially triangular brackets 15 which are secured to the rear of the back plate 12 and are provided with aligned apertures 16 to receive axles 17 of suitable travelling wheels 18, as will be clearly apparent from Figure 8. The frame also includes an arcuate hood 19 which is secured to the back plate 12 and side plates 13 and projects forwardly from the back plate.

An elongated carrier 20 is movable upwardly and downwardly relative to the frame 11 and consists of a pair of lower side members 21 having their upper ends secured together by a cross-member 22, while a pair of upper side members 23 are secured to the cross-member 22 and are spanned at their upper ends by a cross-piece 24 provided with a suitable handle 25. The lower side members 21 are slidable in tubular guides 26 secured to the forward edges of the side plates 13 of the frame, whereby upward and downward movement of the carrier 20 relative to the frame is facilitated.

The side members 21 of the carrier are provided at their lower ends with a pair of tubular bearings 27 having a rotatable spade unit 28 mounted therein, this spade unit comprising a shaft-like member 29 extending transversely of the carrier and equipped with a set of spade elements or members 30. It is to be noted that these spade members are of such width that they effectively span substantially the entire distance between the side members 21, so that when the spade unit is rotated, the spade members do not leave any substantial portion of the soil between the side members unturned.

Power means are provided for rotating the spade unit 28, these means comprising a suitable electric or gasoline motor 31 which is mounted by brackets 32 between the upper side members 23 of the carrier 20, the motor 31 having a drive shaft 33 which passes freely through an opening 34 in the hood 19 and is operatively connected at its lower end by a gear box 35 to the shaft 29 of the spade unit. A suitable tension spring 36 extends between the gear box 35 and the hood 19 for urging the entire carrier 20 to its raised position relative to the frame 11, but when the handle 25 is pressed downwardly, the carrier is slid downwardly against the resiliency of the spring 36 and the spade unit 28 is pressed into the soil so that the soil is turned and tilled by the rotating spade members 30.

Means are provided for anchoring the entire device to the ground so as to prevent the same from shifting while the spade unit is in operation, these means consisting of a prong unit 37 which is movable upwardly and downwardly relative to the frame 11. As is best shown in Figure 9, the prong unit comprises a transversely extending plate 38 having a row of downwardly projecting prong members 39 provided thereon, while a pair of rods 40 extend upwardly from the plate and are slidable in sets of tubular guides 41 secured to the back plate 12 of the frame 11. A tension spring 42 extends between a lug 43 secured to the plate 38 and a similar lug 44 secured to the back plate 12 adjacent the top plate 14, whereby the entire prong unit 37 is urged to its upwardly slid position relative to the frame. If desired, the rods 40 may be provided with adjustable collars 45 to limit the extent of upward sliding of the prong unit. It will be also noted that the plate 38 is provided with a rearwardly projecting foot plate 46 whereby the entire prong unit may be pressed downwardly so that the prong members 39 penetrate the ground to anchor the device against displacement while the spade unit 28 is in operation.

When the invention is to be placed in use, it may be tilted rearwardly by the handle 25 and wheeled along the ground to the site where soil is to be turned or tilled. During this transportation the spade unit 28 and the prong unit 37 will be held in their raised positions out of ground engagement by the respective springs 36, 42. When the site of operation is reached, downward pressure is applied to the foot plate 46 so as to force the prong members 39 into the ground to hold the device against displacement, while at the same time the handle 25 is pressed downwardly and the motor 31 is energized.

As a result, the spade unit 28 will rotate and work itself into the soil, thus effectively tilling the same.

Thereupon, pressure on the handle 25 is relaxed so that the spring 36 may return the spade unit to its raised position, while at the same time pressure is removed from the foot plate 46 so that the spring 42 may withdraw the prong members 39 from the ground. The device may then be moved or shifted for the next cycle of operation. If desired, the frame 11 may be equipped with dual wheels rather than single wheels as shown.

While in the foregoing there has been described and shown the preferred embodiment of the invention, various modifications may become apparent to those skilled in the art to which the invention relates. Accordingly, it is not desired to limit the invention to this disclosure and various modifications may be resorted to, such as may lie within the spirit and scope of the appended claims.

What is claimed as new is:

1. A power driven soil spade, comprising in combination, a wheeled frame, means for anchoring said frame to the ground, an upwardly and downwardly movable carrier mounted on said frame, a handle provided on said carrier for moving the same, a rotary spade unit provided on said carrier and including a set of spade members adapted to engage the soil when the carrier is lowered relative to the frame, and a motor mounted on said carrier and operatively connected to said spade unit for rotating the same, said means for anchoring said frame to the ground comprising a prong unit movable upwardly and downwardly on said frame and adapted to be embedded in the ground when in its lowered position, a foot plate provided on said prong unit for lowering the same relative to said frame, and means for biasing said prong unit to its raised position.

2. A power driven soil spade, comprising in combination, a wheeled frame, a prong unit movable upwardly and downwardly on said frame and including a plurality of downwardly projecting prongs adapted to be embedded in the ground when the prong unit is in its lowered position, whereby to anchor the frame to the ground, resilient means for urging said prong unit to its raised position, a foot plate provided on said prong unit for depressing the same, a carrier movable upwardly and downwardly on said frame, resilient means for urging said carrier to its raised position, a handle provided on said carrier for depressing the same, a rotary spade unit provided on said carrier and including a set of spade members adapted to engage the soil when the carrier is depressed, and a motor provided on said carrier and operatively connected to said spade unit for rotating the latter.

3. The structure as defined in claim 2 together with a hood secured to said frame, said hood being disposed above said spade unit and below said motor.

4. In a power driven soil spade, the combination of a wheeled frame provided with guides, means for anchoring said frame to the ground, a carrier movable upwardly and downwardly relative to said frame and including side members freely slidable in said guides, a handle provided on said carrier whereby the same may be depressed relative to the frame, a rotatable spade unit provided on said carrier and adapted to engage the soil when the carrier is depressed, power means for driving said spade unit, resilient means for biasing said carrier to its raised position, a second set of guides provided on said frame, said means for anchoring the frame to the ground being movable upwardly and downwardly relative to the frame and including rods freely slidable in said second set of guides, a prong unit secured to said rods and adapted to be embedded in the ground when the rods are slid downwardly, a foot plate provided on said prong unit for lowering the same, and resilient means for biasing said prong unit to its raised position.

References Cited in the file of this patent

UNITED STATES PATENTS

| | | |
|---|---|---|
| 2,250,391 | Ober | July 22, 1941 |
| 2,303,726 | Dettloff et al. | Dec. 1, 1942 |
| 2,622,498 | Wharton | Dec. 23, 1952 |

FOREIGN PATENTS

| | | |
|---|---|---|
| 714,394 | Great Britain | Aug. 25, 1954 |